No. 631,976. Patented Aug. 29, 1899.
D. J. WHITTEMORE.
LEVEL FOR TRACKS.
(Application filed May 16, 1898.)
(No Model.)
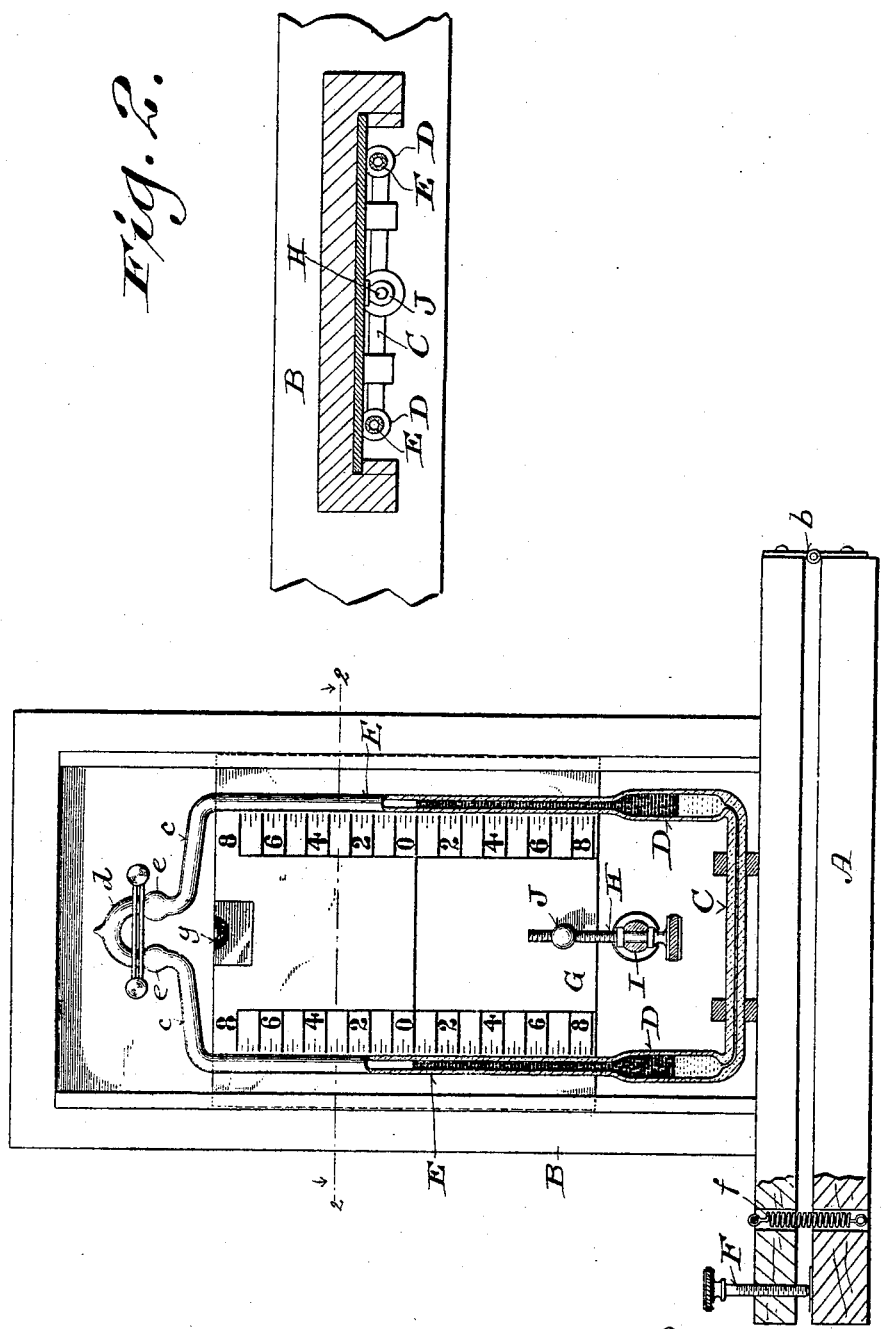
Witnesses:
Geo. W. Young.
N. E. Oliphant.
Inventor:
Don J. Whittemore.
By W. G. Underwood
Attorneys

UNITED STATES PATENT OFFICE.

DON J. WHITTEMORE, OF MILWAUKEE, WISCONSIN.

LEVEL FOR TRACKS.

SPECIFICATION forming part of Letters Patent No. 631,976, dated August 29, 1899.

Application filed May 16, 1898. Serial No. 680,786. (No model.)

*To all whom it may concern:*

Be it known that I, DON J. WHITTEMORE, a citizen of the United States, and a resident of Milwaukee, in the county of Milwaukee and State of Wisconsin, have invented certain new and useful Improvements in Instruments of Precision; and I do hereby declare that the following is a full, clear, and exact description thereof.

My invention has for its object to provide a simple, economical, and compact instrument by which to readily determine certain conditions of railway-track and the dynamic effect of acceleration and retardation in the movement of trains thereon through the natural laws governing gravity, centrifugal force, and inertia, said instrument being termed an "equilibristat," inasmuch as its function is to show the resultant of forces to which it is sensitive.

Figure 1 of the drawings illustrates a front elevation of one form of the instrument, partly in section; and Fig. 2 a horizontal section of the same on the plane indicated by line 2 2 in the preceding figure.

Preliminary to a detail description of the instrument with reference to the drawings particular attention is invited to certain facts in regard to natural laws having important and vital bearing upon the carrying out of my invention, as follows:

If a U-shaped tube partially filled with liquid be placed upright upon a car-floor transverse to the axis of the same and this floor be on a parallel plane to a railway-track that is transversely level, the surface of the liquid will stand at the same height in both branches of the tube; but in case the track-rails are at different elevations, and thereby incline the car-floor, said liquid will descend in one tube branch and rise in the other. By observing the total change that takes place through the superior elevation of one track-rail above the other and knowing the horizontal width between the centers of the tube branches, as well as the gage of the track, the difference in elevation of said rails may be readily determined.

In case the U-shaped tube be in the position above specified and the car is at rest on a curve of the railway-track having the outer rail elevated above the inner rail to a degree sufficient to meet the demands of centrifugal force due to a given velocity of trains passing on said curve then the difference in the height of liquid in the branches of said tube will be an index of the superior elevation of one track-rail above the other; but if said car be moving along said curve at the uniform velocity for which said outer rail was elevated and is then by reason of centrifugal force due to this velocity, to gravity, and to the radius of curve traversing the track in a state of equilibrium the liquid will have the same elevation in both branches of the aforesaid tube. It also follows that if the U-shaped tube partially filled with liquid be placed upright parallel to the axis of a railway-car—as, for instance, on a side window-sill—and note be taken of the height at which the liquid stands in each branch of said tube when the car is on level grade then whenever said car is moving along a track at uniform speed on descending or ascending grade the variation in height of said liquid in the tube branches from that indicated when the aforesaid car is on level grade will be an index from which the rate of the ascending or descending grade may be approximately determined. Furthermore, if the tube be in the position last described and movement of the car on the track gradually accelerates or diminishes the mechanical effect of the movement will be shown by its effect in overcoming inertia of the liquid and causing the same to vary its elevation in the tube branches.

From the foregoing it will be understood that the liquid in the simple partially-filled U-shaped tube observes well-known statical law under the conditions described; but for several reasons such apparatus without important modifications is not of value for the purposes desired to be accomplished by my invention. For instance, if small increments of difference in level were to be indicated the dimensions of the U-shaped tube would be too great for convenient use, and if said tube had uniform caliber every shock imparted thereto from various sources would cause such motions or fluctuations of the liquid in said tube as to render it impossible to observe the height of said fluid with that degree of accuracy demanded of an instrument intended for use on a railway-car for the purpose of determining differences of track-level in a lateral direction, the proper elevation of outside rails of track curves, approximate rate of ascending or descending track-grades, and the mechanical effect of accelerating or diminishing forces upon the car or train of which it may form a part. Therefore my invention consists in the peculiarities of construction and arrangement of parts constituting the instrument of precision hereinafter particularly set forth with reference to the accompanying drawings and subsequently claimed.

In any form of an instrument according to my invention an endless tube of varied caliber is essential and some of this tube is necessarily transparent. Therefore it follows that said tube may be wholly glass or partly glass and partly other material, provision being made for fluid-tight connection of the sections embodied in a tube of the latter description. The tube is to be mounted upon a suitable support, and provision may be had for leveling said tube. As a matter of convenience a scale may be employed parallel to a vertical transparent section or sections of the tube, and said scale may be marked on a vertically-adjustable plate.

Referring by letter to the drawings, A represents a base, and connected by a hinge $b$ to one end of this base is the foot of a frame B, on which is mounted an endless tube comprising a lower horizontal section C, a pair of vertical sections D, and another pair of vertical sections E, the latter sections having converging continuations $c$ connected by an inverted U-bend $d$, provided with enlargements in the form of bulbs $e$. (Shown in Fig. 1.) The section C has the least caliber of any portion of the endless tube, and the sections D have preferably uniform caliber greater than that of the sections E; but it is important that the latter sections be of uniform diameter. In accordance with the utility of the tube-sections they are hereinafter further distinguished by the terms "retarding" tube-section, "accumulating" tube-sections, and "indicator" tube-sections, these latter sections being necessarily transparent, although the others may be opaque.

It is to be observed that the indicator tube-sections are directly over the accumulating tube-sections, or, in other words, each accumulating tube-section and corresponding indicator tube-section have the same vertical center, the purpose of this construction being hereinafter explained.

An adjusting-screw F is arranged in the foot of tube-supporting frame B to bear on base A at that end of the same farthest from hinge $b$, and a tension-spring $f$ connects said frame-foot and base. By means of the screw the frame may be adjusted on its hinge to a true vertical position determined by means of a spirit-level $g$, arranged on said frame or upon a scale-plate G, that constitutes part of the instrument herein shown.

The frame-stiles are provided with guide-grooves for the scale-plate, and a tangent-screw H, working in an arm I of the frame, engages a nut J on said scale-plate, whereby the latter may be more or less delicately adjusted in a vertical direction.

The scale on plate G indicates units of measurement in ascending and descending order from a zero-mark, and fractions of these units may be indicated on the plate, as herein shown.

The retarding tube-section C and accumulating tube-sections D contain mercury to about one-half the height of the latter tube-sections, and preferably tinted alcohol is contained in the remainder of said accumulating tube-sections and the indicator tube-sections to about one-half the height of these indicator tube-sections, the scale-plate of the instrument being adjusted to have its zero-mark coincide with the top of the alcohol columns in the indicator tube-sections. While tinted alcohol is preferred, any light liquid that will not act chemically on the mercury or congeal at ordinary temperature may be utilized, and it is important that the liquids be run in the endless tube when the temperature is about 60° Fahrenheit.

The liquids having been placed in the endless tube, the inlet of the latter is hermetically sealed, it not being necessary to exhaust air from said tube above the liquid-surface, although it is important that the glass thereof has undergone the molecular change to which it is subject after being blown.

Should more alcohol be found in one indicator tube-section than in the other, as will happen occasionally, the inequality may be corrected by inclining the device sidewise, thereby allowing the mercury to pass from one accumulating tube-section through the retarding tube-section to the other accumulating tube-section, over which there is a surplus alcohol. Thus the supply of alcohol will be forced over, across, and through the inverted-U-shaped tube-section to the indicator tube-section where the alcohol is deficient, and when the device is again brought to an upright position a modicum of alcohol will be left in the enlarged caliber or bulb of the U-shaped tube-section through which the air below will pass, thus permitting the alcohol in said bulb to run down the indicator tube-section where alcohol is wanted. By this mode of manipulation the alcohol can be easily adjusted so as to stand at the same height in each indicator tube-section when the retarding tube-section is level. It will be seen that if the device be inclined mercury will pass from one accumulating tube-section to the other, thereby forcing the alcohol up in one indicator tube-section and causing it to fall in the other. The amount that the alcohol column will rise in one indicator tube-section with a corresponding fall in the other is dependent upon the inclination of the device sidewise, the relative specific gravity of alcohol and mercury, and the ratio that the area of the caliber of the accumulating tube-sections bears to that of the indicator tube-sections, and dependent also (when the device is carried upright with the retarding tube-section transversely with the axis of a car moving on a circular orbit) upon the action of centrifugal force generated upon the mercury. When the instrument is carried upright with the retarding tube-section parallel to the axis of a car, the ascending and descending gradients in the line of railway also have a share in determining the difference in the heights of the two alcohol columns. The height of alcohol in said tube-sections will be affected in a similar manner when the instrument, placed as last mentioned, is subjected to gradually retarding or accelerating velocity of the car moving over a line of railway.

The most most useful purpose of this instrument is, however, to ascertain whether the two opposite rails of a railway-track are on the same transverse level on tangent lines and whether the outer rail on curved lines of track is properly elevated above the inner one to suit the speed of passing trains.

For the purpose last above described the instrument is placed transversely to the axis of a car and may be so proportioned in the different parts that when the retarding tube-section is inclined to the same angle that one-inch elevation of one rail above the opposite rail makes from a horizontal or level line, the mercury in flowing from one accumulating tube-section through the retarding tube-section to the other accumulating tube-section will cause a rise of alcohol in the indicator tube-section immediately connected therewith of about three-tenths of an inch. This may be considered a convenient unit into which the scale attached to the device may be divided, so that one unit of the scale will correspond to one inch of superelevation of one rail of the track above the other opposite. This unit of the scale may be made greater or less, if desired, by properly proportioning the parts.

The caliber of the indicator tube-sections need not be more than about three thirty-seconds of an inch to enable one several feet away to determine with the unaided eye the position of the alcohol column in reference to its top, as shown by the scale described, to such fraction of its unit as is desired for practical purposes.

With the indicator tube-sections of the caliber above mentioned I have ascertained that by having the caliber of the retarding-tube such that about five inches of it will contain as much mercury as would be contained in one inch of an indicator tube-section, or, in other words, by having the sectional area of the latter about five times greater than that of the retarding tube-section, the mercury in passing from one accumulating tube-section to the other to adjust itself to impulses caused by those frequent shocks of differences of level that occur many times a second when a car is moving with any considerable velocity would by reason of resistance to the rapid flow of mercury through the small caliber of the retarding tube-section be so retarded that before a fraction of such effect could be communicated from one accumulating tube-section to the other this effect would be negated in a great measure by opposing shocks, so that only those differences of level that exist for some space along the track would be clearly shown by the rise and fall of the alcohol in the indicator tube-sections without any disturbing fluctuations caused by minor frequent shocks.

In case the retarding tube-section is made of metal its caliber need not be contracted, as the object can be more easily attained by inserting anywhere in its length a reducing-cock, whereby the aperture for the flow of mercury through said tube-section can be reduced at will to any extent desired.

The unit employed on American railways to express what should be the superelevation of outer rails on curves is the inch, and for the purpose of determining the superelevation of rails on railway-curves or on tangents with the degree of accuracy desired the width between the centers of the two accumulating tube-sections of the herein-described instrument need not be much, if any, over four inches, and assuming that this width is also known there remains to be determined what the ratio should be between the sectional area of the accumulating tube-sections and that of the indicator tube-sections to cause the alcohol to rise one scale-unit in one indicator tube-section with a corresponding fall in the other whenever the inclination of the retarding tube-section corresponds to the inclination caused by raising one rail of a railway-track one inch above its opposite rail.

While it is not necessary that both accumulating tube-sections be of the same caliber, it will be found convenient to have them so, and in this event the instrument may be proportioned so as to satisfy the following formula, in which W equals width between centers of accumulating tube-sections. R equals the ratio that the sectional area of the accumulating tube-sections bears to that of the indicator tube-sections as unity. S equals the specific gravity of tinted alcohol or other light liquid used. M equals the specific gravity of mercury. G equals the gage of the railway-track measured from the center of one rail to the center of its opposite. U equals the scale-unit in its decimal of a unit or other lineal measures.

*Formula.*

$$\frac{W}{2G} \cdot \frac{S}{U} - \frac{S}{M} = \frac{1}{R}.$$

It is evident from the above formula that the instrument should be so proportioned that $\dfrac{W}{2G, U}$ will be greater than $\dfrac{S}{M}$.

Assuming that the standard railway-gage of America is fifty-nine inches, measured as above stated, that the unit of the indicator-scale desired is .3 of an inch, that the ratio which the cross-sectional area of the accumulating tube-sections bears to that of the indicator tube-sections is 20, that the specific gravity of mercury is 13.58, and that of tinted alcohol is .83, then, by the above formula, the width between the accumulating tube-sections is ascertained to be 3.98 inches—a width amply sufficient for the purpose desired in ascertaining transverse differences in level of railway-track.

If the instrument is intended for determining gradients in the line of railroad or for indicating the effect of retarding or accelerating forces, the proportions of said instrument would be changed to suit that class of work, care being taken that the indicator tube-sections have like and uniform caliber.

The scale-plate of the instrument should be long enough to cover about nine units above and the same below zero-line, nine inches of superior elevations of rails on standard gage-tracks of America being about the maximum in general practice. The calibrated indicator tube-sections should be about twenty-two of the scale-units long, and the scale-plate should have range of adjustment at least two units up and down from where the alcohol in said tube-sections will stand at normal temperature of 60° Fahrenheit. In this way the zero-line of scale-plate may be adjusted to coincide with the top of alcohol-columns at other temperatures.

While making tests with this device should the temperature not change over about 3° Fahrenheit no readjustment of the scale-plate will be required. Any change caused by change of temperature is easily detected by the unequal records of the indicator tube-sections.

Though it is not necessary to have the caliber of the accumulating tube-sections uniform beyond the space through which the mercury ranges, yet it will be found convenient in an instrument to be used in determining superior elevation of rails of railway-track to have the caliber of the tube-sections uniform for a distance equal to at least one-fifth of the width they are apart between centers.

It is not necessary that alcohol or other light liquid should be in more than one of the indicator tube-sections, in which case the scale will be single also. The reason that the use of alcohol is recommended in both indicator tube-sections is that it affords an easy method of detecting any change in volume that may occur during use through changes of temperature, while if one indicator tube-section is used observations must frequently be made to see if the single alcohol-column reaches zero of the scale when the instrument is level.

It is practical to make the instrument with only one indicator tube-section, and in such case the area of the accumulating tube-sections need not have so high a ratio to that of the indicator tube-sections as prevails when two indicator tube-sections are used, even though the distance between accumulating tube-sections be the same as that above specified. Therefore the formula for a single indicator tube-section instrument may be $\dfrac{W}{G, U} - \dfrac{S}{M} = \dfrac{2}{R}$, and with this formula the instrument must be proportioned so that $\dfrac{W}{G, U}$ will be greater than $\dfrac{S}{M}$, it being ascertained that by having the ratio of 12.4 between the sectional area of accumulating tube-sections and that of a single indicator tube-section the above-described scale-unit results with the same width between accumulating tube-sections.

If an instrument in accordance with my invention be placed and properly adjusted on or in a railway-car standing on a track that is level transversely, then as the car moves along and over the track elsewhere on tangent lines the rise and fall of the alcohol in the indicator tube section or sections will indicate correctly any transverse variations in the level of the two opposite rails. Again, when the car with the instrument passes along and over a curved line at so slow a speed as not to generate centrifugal force to any appreciable extent the alcohol column or columns by rise or fall will indicate the extent of superior elevation of the outer rail over the opposite or inner rail of the curved track passed over; but if the device is being carried over the curved line at a high and uniform velocity and the outer rail of said track has been elevated above its opposite a proper amount the alcohol will register zero on the scale, and if the curved track has its outer rail improperly elevated for such velocity the amount of such improper elevation will be shown by the extent the alcohol stands above or below zero of the scale-units. Hence the importance of having the indicator tube-sections directly in line with the accumulating tube-sections above the same, as thereby no allowance has to be made for the influence of centrifugal force upon the instrument, or, in other words, there is no opposing centrifugal force in the light liquid to the centrifugence of the heavy liquid. Therefore the indications of such force, as shown by the rise and fall of said light liquid in the indicator tube-sections, are as accurate as when the device is utilized as a leveling instrument.

Air left in the endless tube at atmospheric pressure when the instrument was hermetically sealed is also influenced by the force which acts on the mercury and which tends to negate the action on the latter in the proportion which the specific gravity of air bears to that of mercury, both estimated on the same basis. Hence it follows that there is an error in the foregoing statement, which can be represented by a fraction having for its numerator the specific gravity of air and for its denominator the specific gravity of mercury, this being approximately $\frac{1}{11000}$, a fraction that cannot be measured by the instrument, and therefore can be disregarded entirely; but it is evident that this minute error can be wholly eliminated by producing a vacuum in the tube above the alcohol at the time of hermetically sealing, a refinement entirely unnecessary in an instrument designed for the purpose above mentioned.

It is notorious that a curved track having its outer rail elevated, so that a train passing over it at a certain desired and uniform velocity will be in equilibrium, does not remain so elevated for any considerable length of time. Heavily-loaded freight-trains passing over such track at slower speed throw a preponderance of weight on the inner rail, thus causing it to settle in the yielding ballast more than the outer one. Again, traversing the curved track at higher velocity than that for which the track was adjusted brings a preponderance of stress on the outer rail and tends to depress the same in the ballast more than the inner rail. Hence changes occur that should be corrected from time to time. Therefore by an instrument such as herein set forth these errors may be easily detected and located.

When properly placed and adjusted in a business-car, the instrument will afford valuable and accurate information to the manager, superintendent, or engineer of maintenance of way as to the condition of the track in respect to undue or insufficient elevation of one rail over its opposite, and, again, when the device is properly placed on a hand-car or velocipede-car or a vehicle constructed for the purpose and passed slowly over the track the road-master, inspector, or track or section foreman can readily observe the transverse conditions of the track passed over more accurately and at less trouble and expense than by the prevailing methods.

Having thus described my invention, what I claim as new, and desire to secure by Letters Patent, is—

1. As a means for determining certain conditions of railway-track and dynamic effect of acceleration and retardation in the movement of trains thereon, a tube having a lower horizontal section, opposite vertical sections of comparatively large caliber rising from the extremities of the horizontal section and other sections of less caliber extending directly upward from those of large caliber, whereby these tube-sections of different caliber have the same vertical center, a heavy liquid contained in the three lower tube-sections but having retarded flow in the horizontal one of these sections, and a lighter liquid supported in the tube by the heavy liquid, said tube being transparent for at least so much of a vertical portion thereof as will serve to render visible varying elevation of a column of the lighter liquid.

2. An instrument of precision comprising an endless tube having a lower horizontal section, opposite vertical sections of comparatively large caliber rising from the extremities of the horizontal section and other sections of less caliber extending directly upward from those of large caliber, whereby these tube-sections of different caliber have the same vertical center, a heavy liquid contained in the three lower tube-sections but having retarded flow in the horizontal one of these sections, and a lighter liquid supported in the tube by the heavy liquid, said tube being transparent for at least so much of a vertical portion thereof as will serve to render visible varying elevation of a column of the lighter liquid.

3. An instrument of precision comprising a tube having a lower horizontal section, opposite vertical sections of comparatively large caliber rising from the extremities of the horizontal section and other sections of less caliber extending directly upward from those of large caliber, whereby these tube-sections of different caliber have the same vertical center, a heavy liquid contained in the three lower tube-sections but having retarded flow in the horizontal one of these sections, a lighter liquid supported in the tube by the heavy liquid, said tube being transparent for at least so much of a vertical portion thereof as will serve to render visible varying elevation of a column of the lighter liquid, and a scale in proximity to the visible column of said lighter liquid to mark its rise or fall from a predetermined elevation.

4. An instrument of precision comprising a frame adjustable to level, a frame-supported tube having a lower horizontal section opposite vertical sections of comparatively large caliber rising from the extremities of the horizontal section and other sections of less caliber extending directly upward from those of large caliber, whereby these tube-sections of different caliber have the same vertical center, a heavy liquid contained in the three lower tube-sections but having retarded flow in the horizontal one of these sections, and a lighter liquid supported by the heavy liquid, said tube being transparent for at least so much of a vertical portion thereof as will serve to render visible varying elevation of a column of the lighter liquid.

5. An instrument of precision comprising a frame adjustable to level, a frame-supported tube having a lower horizontal section, opposite vertical sections of comparatively large caliber rising from the extremities of the horizontal section and other sections of less caliber extending directly upward from those of large caliber, whereby these tube-sections of different caliber have the same vertical center, a heavy liquid contained in the three lower tube-sections but having retarded flow in the horizontal one of these sections, a lighter liquid supported by the heavy liquid, said tube being transparent for at least so much of a vertical portion thereof as will render visible varying elevation of a column of lighter liquid, and a scale in proximity to the visible column of said lighter liquid to mark its rise or fall from a predetermined elevation.

6. An instrument of precision comprising an endless tube having a lower horizontal section, a pair of opposite vertical sections of comparatively large caliber, at least one vertical section of less caliber extending directly upward from a large-caliber section whereby these tube-sections of different caliber have the same vertical center, and an upper inverted-U bend having its branches provided with bulb enlargements, a heavy liquid having retarded flow in the horizontal tube-section from one to the other of the tube-sections of greatest caliber, and a lighter liquid supported in the tube by the heavy liquid, said tube being transparent for so much thereof as will serve to render visible varying elevation of a column of the lighter liquid.

In testimony that I claim the foregoing I have hereunto set my hand, at Milwaukee, in the county of Milwaukee and State of Wisconsin, in the presence of two witnesses.

DON J. WHITTEMORE.

Witnesses:
N. E. OLIPHANT,
H. G. UNDERWOOD.